US011574060B2

(12) United States Patent
Gomes et al.

(10) Patent No.: US 11,574,060 B2
(45) Date of Patent: Feb. 7, 2023

(54) SECURE INITIAL PROGRAM LOAD

(71) Applicant: INTERNATIONAL BUSINESS MACHINES CORPORATION, Armonk, NY (US)

(72) Inventors: Louis P. Gomes, Poughkeepsie, NY (US); Martin Schwidefsky, Boeblingen (DE); Reinhard T. Buendgen, Tuebingen (DE); Viktor Mihajlovski, Wildberg (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 749 days.

(21) Appl. No.: 16/392,833

(22) Filed: Apr. 24, 2019

(65) Prior Publication Data
US 2020/0342111 A1    Oct. 29, 2020

(51) Int. Cl.
*G06F 21/57* (2013.01)
(52) U.S. Cl.
CPC .......... *G06F 21/575* (2013.01); *G06F 21/577* (2013.01)
(58) Field of Classification Search
CPC ............................. G06F 21/575; G06F 21/577
See application file for complete search history.

(56) References Cited

U.S. PATENT DOCUMENTS

| | | | |
|---|---|---|---|
| 3,996,449 A | 12/1976 | Attanasio et al. | |
| 5,022,077 A | 6/1991 | Bealkowski et al. | |
| 5,349,643 A | 9/1994 | Cox et al. | |
| 6,823,463 B1 | 11/2004 | Challener et al. | |
| 8,219,827 B2 | 7/2012 | Nicolson et al. | |
| 8,560,820 B2 * | 10/2013 | de Cesare .......... | H04N 21/4432 713/168 |
| 8,984,265 B2 | 3/2015 | Vaid et al. | |
| 9,235,710 B2 | 1/2016 | Jacobs | |
| 9,378,372 B2 | 6/2016 | Kim et al. | |

(Continued)

OTHER PUBLICATIONS

Sinharoy, B. et al., "Advanced features in IBM POWER8 systems," IBM Journal of Research and Development, vol. 59, No. 1, Paper 1, Jan./Feb. 2015, pp. 1:1-1:18.

(Continued)

*Primary Examiner* — Jaweed A Abbaszadeh
*Assistant Examiner* — Hyun Soo Kim
(74) *Attorney, Agent, or Firm* — Edward J. Wixted III, Esq.; Blanche E. Schiller, Esq.; Heslin Rothenberg Farley Mesiti P.C.

(57) ABSTRACT

An initial program load of a system component of a computing environment is performed. A determination is made as to whether one or more signatures of one or more signed binary code components relating to the system component are verified. Based on determining that the one or more signatures are verified, additional verification is performed. The additional verification includes obtaining a select binary code component of one or more binary code components relating to the system component and determining whether the select binary code component is a particular signed binary code component. Based on determining that the select binary code component is the particular signed binary code component, a check is performed. The initial program load is continued based on a successful check.

24 Claims, 13 Drawing Sheets

(56) References Cited

U.S. PATENT DOCUMENTS

| | | | |
|---|---|---|---|
| 10,057,243 B1 | 8/2018 | Kumar et al. | |
| 10,057,342 B2 | 8/2018 | Kumar et al. | |
| 2003/0188165 A1 | 10/2003 | Sutton, II et al. | |
| 2006/0026429 A1* | 2/2006 | Kudo | G06F 21/575 |
| | | | 713/173 |
| 2006/0129486 A1* | 6/2006 | Ohkuma | G06Q 20/38 |
| | | | 705/44 |
| 2012/0254995 A1* | 10/2012 | Sallam | G06F 21/566 |
| | | | 726/22 |
| 2014/0129818 A1* | 5/2014 | Li | G06F 21/79 |
| | | | 713/2 |
| 2016/0147997 A1 | 5/2016 | Dover | |
| 2017/0359171 A1* | 12/2017 | Haridas | H04L 9/0891 |
| 2018/0314831 A1 | 11/2018 | Liu et al. | |

OTHER PUBLICATIONS

IBM, "z/ Architecture—Principles of Operation," IBM Publication No. SA22-7832-11, Twelfth Edition, Sep. 2017, pp. 1-1902.

Mell, Peter and Tim Grance, "The NIST Definition of Cloud Computing," National Institute of Standards and Technology, Information Technology Laboratory, Special Publication 800-145, Sep. 2011, pp. 1-7.

Communication Pursuant to Rules 161(1) and 162 EPC and Written Opinion of the International Searching Authority, Application No. 20717144 8-1218, dated Dec. 1, 2021, pp. 1-14.

\* cited by examiner

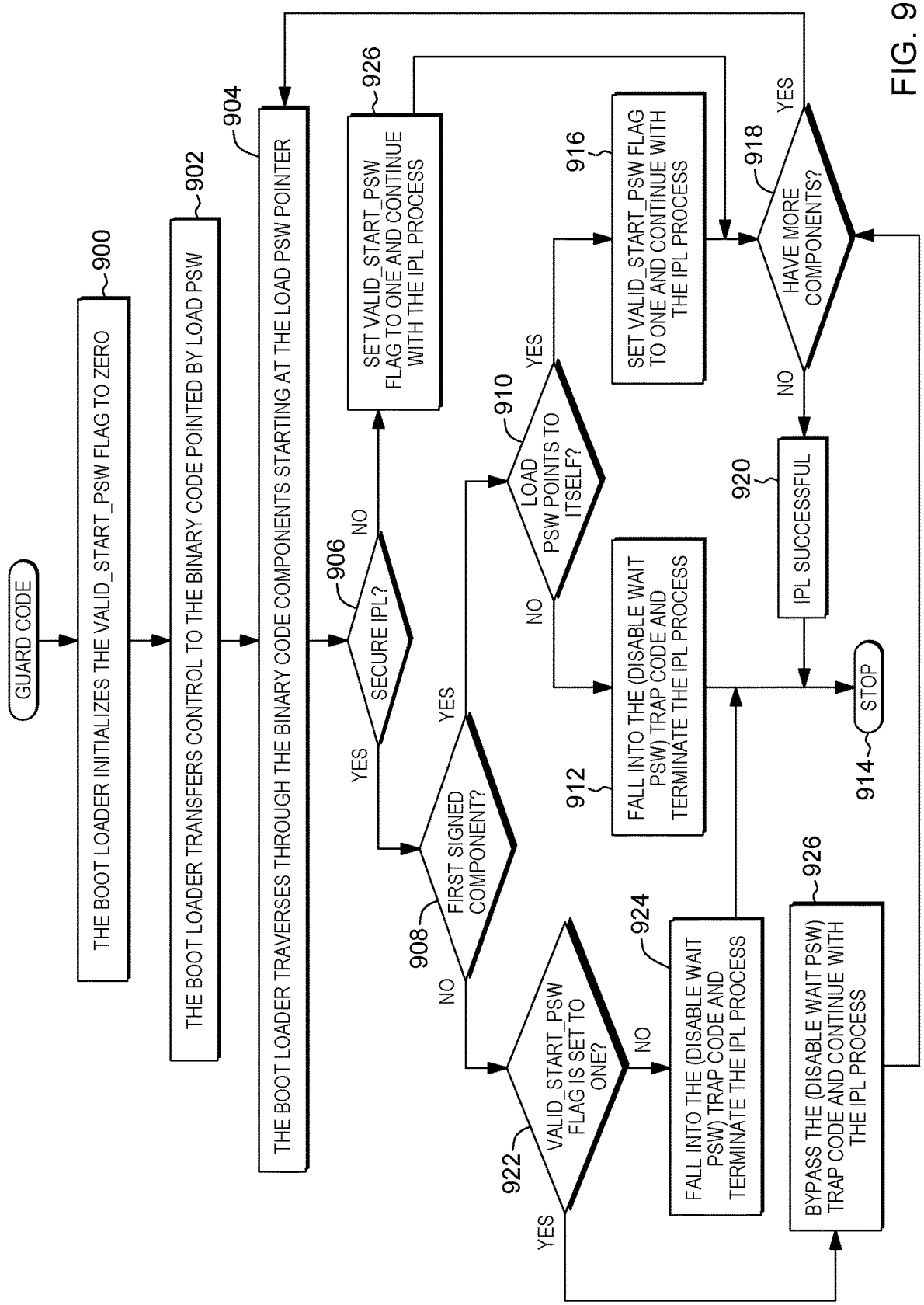

```
┌─────────────────────────────────────────────────────────────────────────┐
│  ┌───────────────────────────────────────────────────────────────────┐  │
│  │ PERFORM AN INITIAL PROGRAM LOAD OF A SYSTEM COMPONENT (E.G., A    │  │
│  │ KERNEL) OF THE COMPUTING ENVIRONMENT ~1000                        │  │
│  │                                                                    │  │
│  │     DETERMINE WHETHER ONE OR MORE SIGNATURES OF ONE OR MORE       │  │
│  │     SIGNED BINARY CODE COMPONENTS RELATING TO THE SYSTEM          │  │
│  │     COMPONENT ARE VERIFIED ~1002                                  │  │
│  │                                                                    │  │
│  │     PERFORM ADDITIONAL VERIFICATION, BASED ON DETERMINING THAT    │  │
│  │     THE ONE OR MORE SIGNATURES ARE VERIFIED ~1004                 │  │
│  │                                                                    │  │
│  │         OBTAIN A SELECT BINARY CODE COMPONENT OF ONE OR MORE      │  │
│  │         BINARY CODE COMPONENTS RELATING TO THE SYSTEM             │  │
│  │         COMPONENT ~1006                                           │  │
│  │                                                                    │  │
│  │         DETERMINE WHETHER THE SELECT BINARY CODE COMPONENT IS A   │  │
│  │         PARTICULAR SIGNED BINARY CODE COMPONENT WITH RESPECT TO   │  │
│  │         THE ONE OR MORE BINARY CODE COMPONENTS (E.G., A FIRST     │  │
│  │         SIGNED BINARY CODE COMPONENT) ~1008                       │  │
│  │                                                                    │  │
│  │         PERFORM A CHECK BASED ON DETERMINING THAT THE SELECT      │  │
│  │         BINARY CODE COMPONENT IS THE PARTICULAR SIGNED BINARY     │  │
│  │         CODE COMPONENT ~1010                                      │  │
│  │                                                                    │  │
│  │         CONTINUE WITH PERFORMING THE INITIAL PROGRAM LOAD BASED   │  │
│  │         ON A SUCCESSFUL CHECK ~1012                               │  │
│  └───────────────────────────────────────────────────────────────────┘  │
│                                                                          │
│  ┌───────────────────────────────────────────────────────────────────┐  │
│  │ THE ONE OR MORE BINARY CODE COMPONENTS INCLUDE THE ONE OR MORE    │  │
│  │ SIGNED BINARY CODE COMPONENTS AND ONE OR MORE UNSIGNED BINARY CODE│  │
│  │ COMPONENTS, AND THE ONE OR MORE BINARY CODE COMPONENTS ARE        │  │
│  │ UNORDERED ~1014                                                   │  │
│  └───────────────────────────────────────────────────────────────────┘  │
│                                                                          │
│  ┌───────────────────────────────────────────────────────────────────┐  │
│  │ THE ONE OR MORE SIGNATURES ARE STORED SEPARATELY FROM THE ONE OR  │  │
│  │ MORE SIGNED BINARY CODE COMPONENTS ~1016                          │  │
│  └───────────────────────────────────────────────────────────────────┘  │
│                                                                          │
│  ┌───────────────────────────────────────────────────────────────────┐  │
│  │ THE OBTAINING THE SELECT BINARY CODE COMPONENT INCLUDES CHOOSING  │  │
│  │ THE SELECT BINARY CODE COMPONENT BASED ON A POINTER IN A CONTROL  │  │
│  │ LOCATION (E.G., A PROGRAM STATUS WORD) ~1018                      │  │
│  └───────────────────────────────────────────────────────────────────┘  │
└─────────────────────────────────────────────────────────────────────────┘
```

FIG. 10A

THE PERFORMING THE CHECK INCLUDES DETERMINING WHETHER THE POINTER POINTS TO ITSELF, IN WHICH THE CHECK IS SUCCESSFUL BASED ON THE POINTER POINTING TO ITSELF ~1020

A VALID INDICATOR IS SET TO A SELECT VALUE, BASED ON THE SUCCESSFUL CHECK ~1022

THE CONTINUING WITH PERFORMING THE INITIAL PROGRAM LOAD INCLUDES

OBTAINING ANOTHER BINARY CODE COMPONENT ~1024

DETERMINING, BASED ON OBTAINING THE OTHER BINARY CODE COMPONENT, WHETHER THE VALID INDICATOR IS SET TO THE SELECT VALUE ~1026

REPEATING, BASED ON DETERMINING THAT THE VALID INDICATOR IS SET TO THE SELECT VALUE, THE OBTAINING AND THE DETERMINING BASED ON THERE BEING OTHER BINARY CODE COMPONENTS TO BE PROCESSED ~1028

THE CONTINUING WITH PERFORMING THE INITIAL PROGRAM LOAD INCLUDES TERMINATING THE INITIAL PROGRAM LOAD BASED ON DETERMINING THAT THE VALID INDICATOR IS SET TO A VALUE OTHER THAN THE SELECT VALUE ~1030

THE PERFORMING ADDITIONAL VERIFICATION FURTHER INCLUDES

DETERMINING WHETHER A SECURE INITIAL PROGRAM LOAD IS TO BE PERFORMED ~1032

PERFORMING, BASED ON DETERMINING THAT THE SECURE INITIAL PROGRAM LOAD IS TO BE PERFORMED, THE DETERMINING WHETHER THE SELECT BINARY CODE COMPONENT IS THE PARTICULAR SIGNED BINARY CODE COMPONENT WITH RESPECT TO THE ONE OR MORE BINARY CODE COMPONENTS ~1034

USE THE ONE OR MORE BINARY CODE COMPONENTS AND THE ONE OR MORE SIGNATURES TO GENERATE AN INFORMATION REPORT BLOCK ~1036

EMPLOY THE INFORMATION REPORT BLOCK IN, AT LEAST, DETERMINING WHETHER THE ONE OR MORE SIGNATURES ARE VERIFIED ~1038

FIG. 10B

SECURE INITIAL PROGRAM LOAD

BACKGROUND

One or more aspects relate, in general, to processing within a computing environment, and in particular, to secure processing within the computing environment.

Secure processing is prudent in many aspects of processing. To assist in providing security in one or more aspects, a Common Criteria has been developed. Common Criteria provides assurance that the process of specification, implementation and evaluation of a computer security product has been conducted in a rigorous, standard and repeatable manner at a level that corresponds with its target use environment. One organization responsible for implementation of the Common Criteria, at least in the United States, is The National Information Assurance Partnership (NIAP). The NIAP provides a methodology to certify that a product or process meets certain security criteria, and upon successful completion, a certification is granted, referred to herein as the Common Criteria certification.

Requirements of the Common Criteria change over time. For instance, a new operating system protection profile for Common Criteria certification has been added, which now requires the support of Secure Boot. Secure Boot is a security standard used to ensure that a device boots using only software trusted by the Original Equipment Manufacturer (OEM). It helps to resist attacks and infections from malware. To comply with the Common Criteria certification, a form of Secure Boot is to be used.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes performing an initial program load of a system component of the computing environment. The performing the initial program load includes determining whether one or more signatures of one or more signed binary code components relating to the system component are verified. Based on determining that the one or more signatures are verified, additional verification is performed. The performing additional verification includes obtaining a select binary code component of one or more binary code components relating to the system component and determining whether the select binary code component is a particular signed binary code component with respect to the one or more binary code components. Based on determining that the select binary code component is the particular signed binary code component, a check is performed. Based on a successful check, the performing of the initial program load continues.

A secure initial program load of a system component, such as a kernel, is provided, enhancing security within a computing environment and facilitating processing within the environment.

In one embodiment, the one or more binary code components include the one or more signed binary code components and one or more unsigned binary code components, and the one or more binary code components are unordered. By not requiring an order, packaging is flexible and less complex. This enables additional device components to be added, etc.

As one example, the one or more signatures are stored separately from the one or more signed binary code components. This enhances security.

In one example, the obtaining the select binary code component includes choosing the select binary code component based on a pointer in a control location. The control location is, for instance, a program status word.

As one example, the performing the check includes determining whether the pointer points to itself, in which the check is successful based on the pointer pointing to itself.

Further, in one example, a valid indicator is set to a select value, based on the successful check.

In one embodiment, the continuing with performing the initial program load includes obtaining another binary code component; determining, based on obtaining the other binary code component, whether the valid indicator is set to the select value; and repeating, based on determining that the valid indicator is set to the select value, the obtaining and the determining based on there being other binary code components to be processed.

In one example, the continuing with performing the initial program load includes terminating the initial program load based on determining that the valid indicator is set to a value other than the select value.

In one example, the performing additional verification further includes determining whether a secure initial program load is to be performed; and performing, based on determining that the secure initial program load is to be performed, the determining whether the binary code component is the particular signed binary code component with respect to the one or more binary code components.

As an example, the particular signed binary code component is a first signed binary code component of the one or more binary code components. Further, as an example, the system component is a kernel.

Moreover, in one embodiment, the one or more binary components and the one or more signatures are used to generate an information report block. The information report block is employed in, at least, determining whether the one or more signatures are verified.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 9 depicts one example of a guard code security checking process, in accordance with an aspect of the present invention;

FIGS. 10A-10B depict one embodiment of facilitating processing within a computing environment, as it relates to one or more aspects of the present invention;

DETAILED DESCRIPTION

In accordance with an aspect of the present invention, a capability is provided to securely perform an initial program load (IPL) of a system component. The system component is, for instance, a kernel, such as an operating system, or other application, program or code that includes one or more code components. In one specific example, the kernel is a Linux® kernel being loaded on an IBM Z° server or an IBM® LinuxONE server. However, in other examples, other kernels and/or system components may be loaded and/or the kernel and/or system components may be loaded on other servers, machines, processors, devices, etc.

One embodiment of a computing environment to incorporate and use one or more aspects of the present invention is described with reference to FIG. 1A. In one example, the computing environment is based on the z/Architecture® hardware architecture, offered by International Business Machines Corporation, Armonk, N.Y. One embodiment of the z/Architecture hardware architecture is described in "z/Architecture Principles of Operation," IBM Publication No. SA22-7832-11, September 2017, which is hereby incorporated herein by reference in its entirety. The z/Architecture hardware architecture is only one example architecture; the computing environment may be based on other architectures.

Figure 1A:
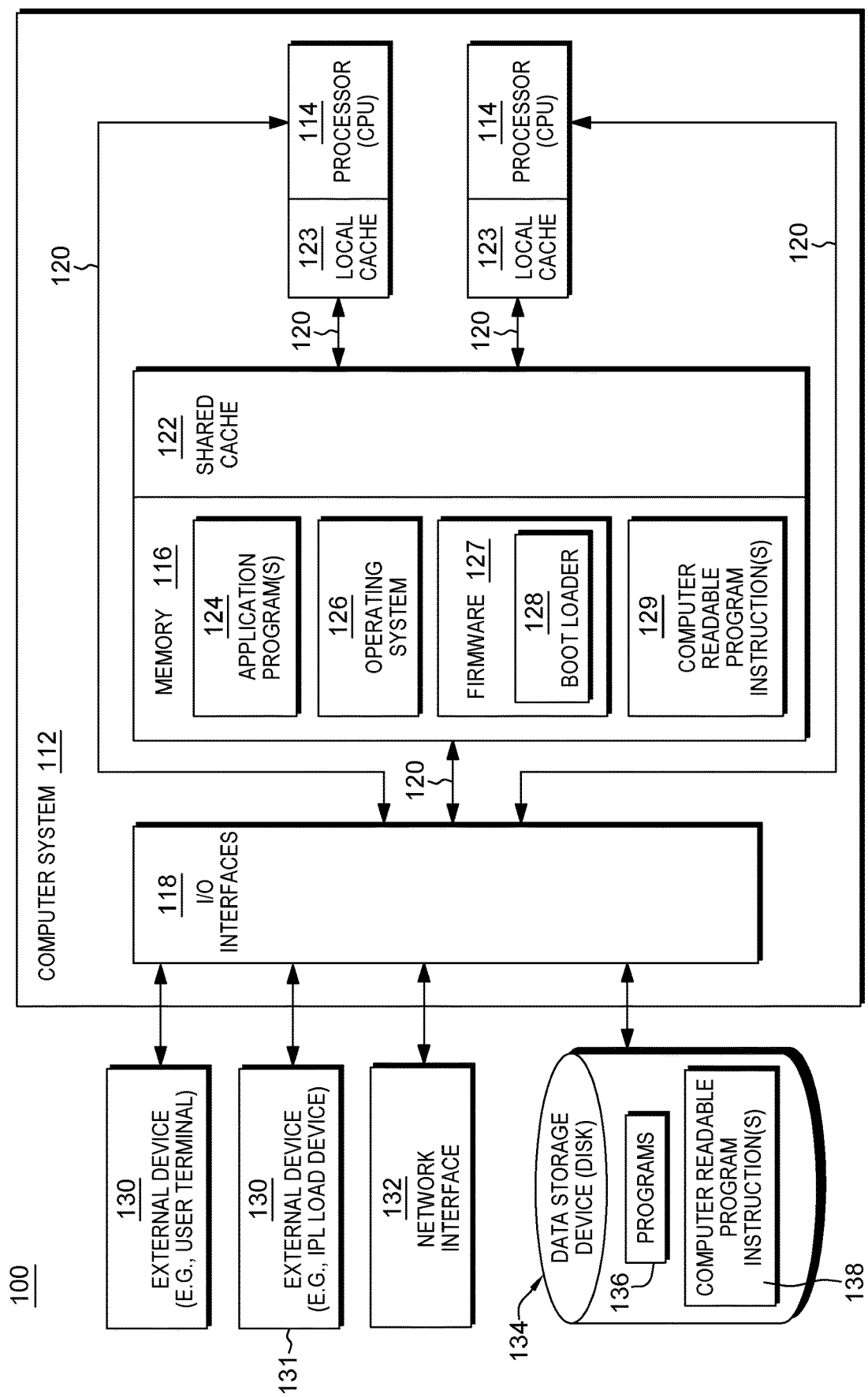
FIG. 1A depicts one example of a computing environment to incorporate and use one or more aspects of the present invention.

As shown in FIG. 1A, a computing environment 100 includes, for instance, a computer system 112 shown, e.g., in the form of a general-purpose computing device. Computer system 112 may include, but is not limited to, one or more processors or processing units 114 (e.g., central processing units (CPUs)), a memory 116 (a.k.a., system memory, main memory, main storage, central storage or storage, as examples), and one or more input/output (I/O) interfaces 118, coupled to one another via one or more buses and/or other connections 120.

Bus 120 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 116 may include, for instance, a cache 122, such as a shared cache, which may be coupled to local caches 123 of processors 114. Further, memory 116 may include one or more programs or applications 124, an operating system 126, firmware 127, and one or more computer readable program instructions 129. Computer readable program instructions 129 may be configured to carry out functions of embodiments of aspects of the invention.

Firmware 127 may include microcode of a processor and/or microcode of the system. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware. In one example, it includes a boot loader 128 used in IPL processing, including secure IPL processing, in accordance with one or more aspects of the present invention.

Computer system 112 may also communicate via, e.g., I/O interfaces 118 with one or more external devices 130, one or more network interfaces 132, and/or one or more data storage devices 134. Example external devices include a user terminal, a tape drive, a pointing device, a display, etc. In one particular example, external device 130 is an IPL load device 131 used for initial program loading of a system component, e.g., a kernel, such as Linux or other kernels. Network interface 132 enables computer system 112 to communicate with one or more networks, such as a local area network (LAN), a general wide area network (WAN), and/or a public network (e.g., the Internet), providing communication with other computing devices or systems.

Data storage device 134 may store one or more programs 136, one or more computer readable program instructions 138, and/or data, etc. The computer readable program instructions may be configured to carry out functions of embodiments of aspects of the invention.

Computer system 112 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 112. Examples include, but are not limited to: microcode, device drivers, redundant processing units, external disk drive arrays, RAID systems, tape drives, and data archival storage systems, etc.

Computer system 112 may be operational with numerous other general purpose or special purpose computing system environments or configurations. Examples of well-known computing systems, environments, and/or configurations that may be suitable for use with computer system 112 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
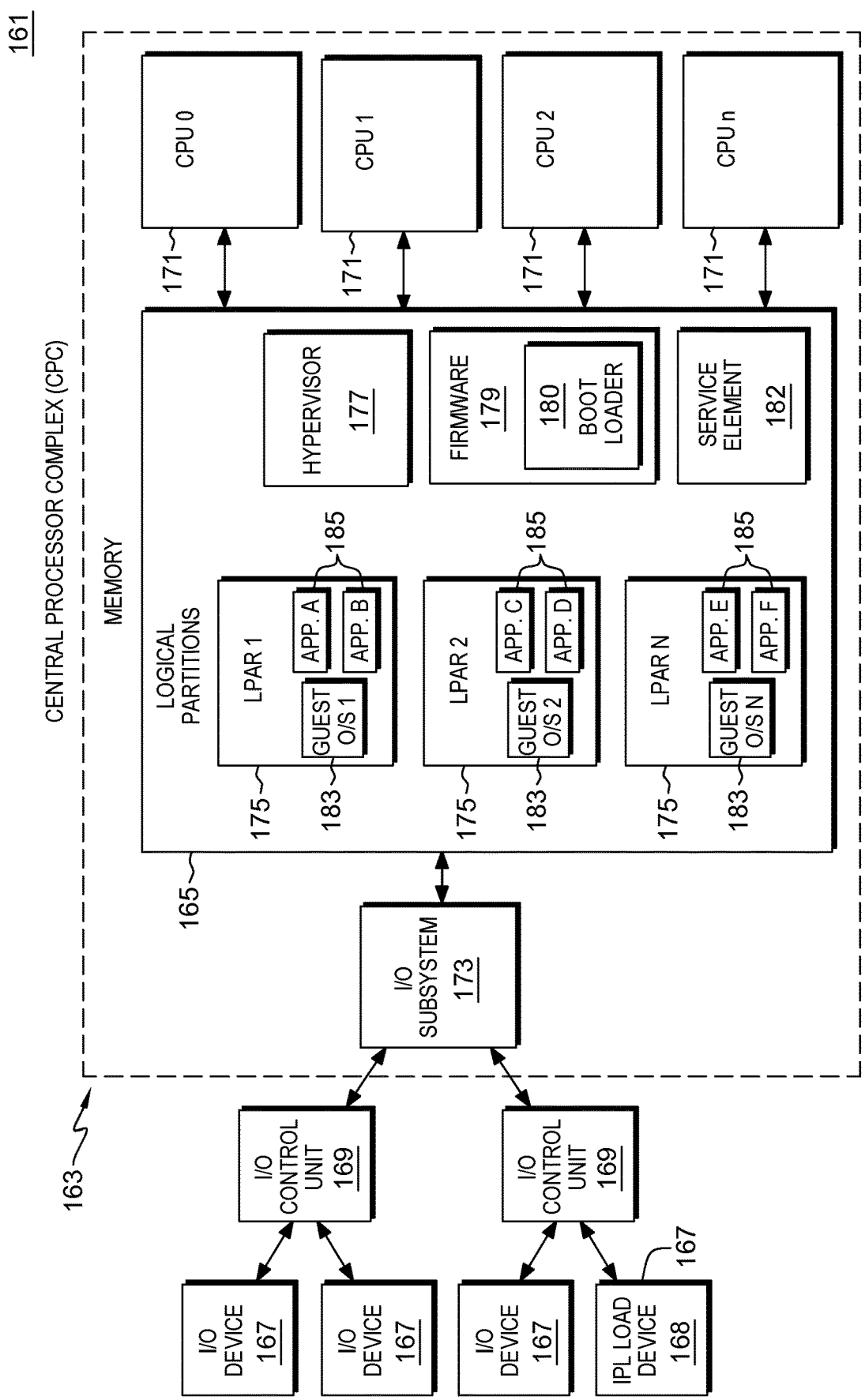
FIG. 1B depicts another example of a computing environment to incorporate and use one or more aspects of the present invention.

In another embodiment, the computing environment supports logical partitions and/or virtual machines. One example of such an environment is described with reference to FIG. 1B. In one example, a computing environment 161 includes a central processor complex (CPC) 163 providing logical partition support. Central processor complex 163 includes, for instance, a memory 165 (a.k.a., system memory, main memory, main storage, central storage, storage) coupled to one or more processors (a.k.a., central processing units (CPUs)) 171 and to an input/output subsystem 173, each of which is described below.

Memory 165 includes, for example, one or more logical partitions 175, a logical partition manager, such as a hypervisor 177, firmware 179, and a service element 182. One example of hypervisor 177 is PR/SM' (Processor Resource/System Manager), offered by International Business Machines Corporation, Armonk, N.Y. The hypervisor is sometimes referred to as a host.

Firmware 179 includes, e.g., the microcode of the processor and/or of the system. Again, it includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware. In one example, firmware 179 includes a boot loader 180 used in IPL processing, including secure IPL processing, in accordance with one or more aspects of the present invention.

In one aspect, service element 182, which may be considered a part of one or more logical partitions or coupled thereto, is used to facilitate initial program loading of the kernel (e.g., operating system 183, as described herein.

The logical partition support of the CPC provides the ability to operate large numbers of logical partitions 175, each capable of operating with different programs 185 and running a guest operating system 183, such as Linux. Each logical partition 175 is capable of functioning as a separate system. That is, each logical partition can be independently reset, run a guest operating system, and operate with different programs. An operating system or application program running in a logical partition appears to have access to a full and complete system, but in reality, only a portion of it is available.

Memory 165 is coupled to processors (e.g., CPUs) 171, which are physical processor resources assignable to the logical partitions. For instance, logical partition 175 includes one or more logical processors, each of which represents all or a share of a physical processor resource 171 that may be dynamically allocated to the logical partition.

Further, memory 165 is coupled to an input/output (I/O) subsystem 173. Input/output subsystem 173 directs the flow of information between input/output control units 169 and I/O devices 167 and main storage 165. It is coupled to the central processing complex, in that it can be a part of the central processing complex or separate therefrom. One example of I/O device 167 is an IPL load device 168 used for initial program loading of a system component, such as a kernel (e.g., Linux kernel or other kernel).

Figures 2A, 2B, 2C:
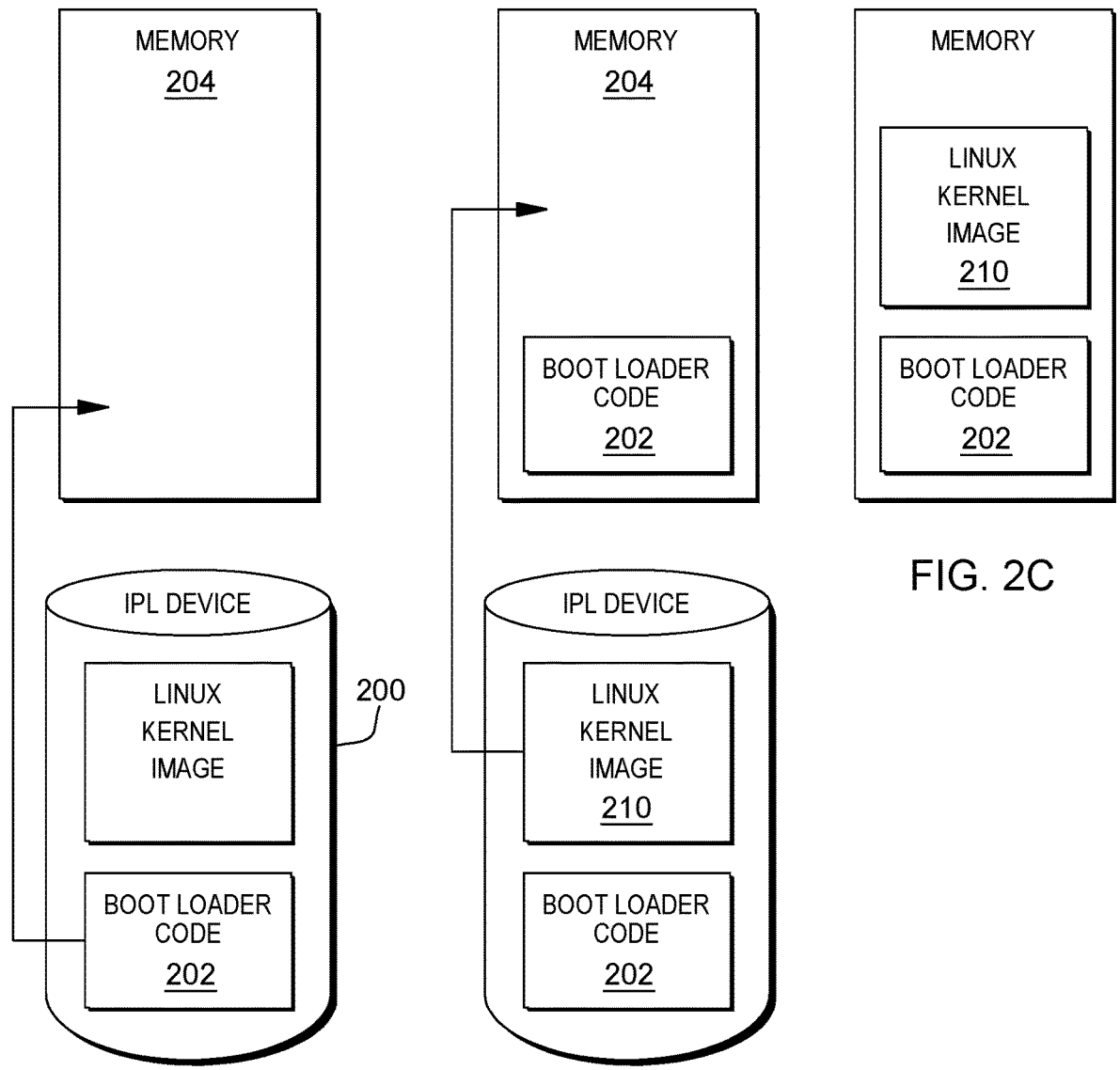
FIGS. 2A-2C depict one example of an initial program load and boot process, in accordance with one or more aspects of the present invention.

Initial program loading provides a mechanism for causing a program to be read from a designated device and for initiating the execution of that program. There are various processes for performing an initial program load and boot process. One example of an initial program load and boot process is described with reference to FIGS. 2A-2C. In one embodiment, referring to FIG. 2A, an IPL process executing on a processor, such as processor 114, accesses an IPL device 200, such as IPL load device 131, and loads boot loader code (e.g., Linux boot loader code) 202 stored thereon to memory 204 (e.g., memory 116), as shown in FIG. 2B. The boot loader code then gets control and loads the kernel (e.g., Linux kernel) 210, as shown in FIG. 2C. At the end of the boot process, the kernel (e.g., Linux kernel) gets control.

In another embodiment in which the kernel instance (e.g., Linux instance) is to run in an LPAR (e.g., LPAR 175), instead of the above IPL process, the kernel may be copied from, e.g., removable media to memory (e.g., memory 165) via a service element (e.g., service element 182). Other examples are also possible.

In one or more embodiments, the boot loader code (also referred to as a boot loader) is loaded, copied or otherwise exists in firmware and is used in performing a secure initial program load of a system component, such as a kernel, in accordance with an aspect of the present invention.

One particular type of initial program load is a list directed IPL, and in accordance with an aspect of the present invention, a list directed IPL is used in a secure IPL process. A list directed IPL mechanism is used to IPL a kernel (e.g., a Linux kernel) from an IPL load device (e.g., IPL load device 168) that contains a list of binary code components (BCCs), as well as from signature certificates obtained through a service element (SE) (e.g., service element 182). In one example, the binary code components and the signature certificates are not packaged together and can be executed in any order to IPL the kernel. Therefore, a particular binary code component packaging format is not used, thus providing packaging flexibility and easier future expansion.

Based on the information obtained from the IP load device and the service element, an IPL information report block (IIRB) is generated and used to perform secure IPL. The IPL information report block includes information used to locate various IPL records and to report the results of signature verification of one or more secure components of the IPL load device. As an example, the IIRB includes two different types of lists: an IPL signature certificate (ISC) list and an IPL device component (IDC) list.

Figure 3:
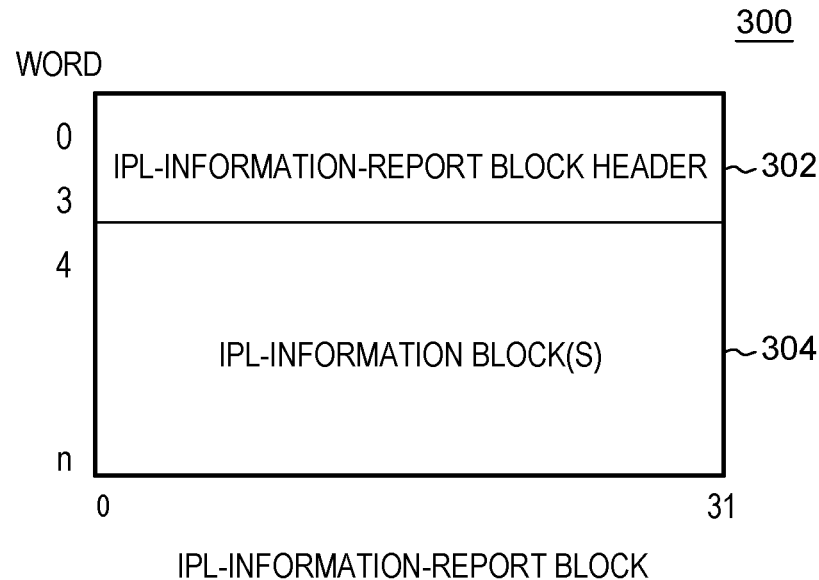
FIG. 3 depicts one example of an initial program load (IPL) information report block used in accordance with an aspect of the present invention.

One example of an initial program load (IPL) information report block (IIRB) is described with reference to FIG. 3. In one example, an IPL information report block 300 (a.k.a., IPL-Information-Report Block) includes an IPL information report block header 302 (a.k.a., IPL-Information-Report Block Header) and one or more IPL information blocks 304. IPL information report block header 302 includes, for instance, a length field indicating a length of the IIRB and a version field specifying a version number for selected IPL parameters. In other examples, it includes one or more flags and/or other, additional and/or less information.

One or more IPL information blocks 304 follow the IPL information report block header 302, in one example. There are multiple types of IPL information blocks including, for instance, a type of IPL information block that identifies an IPL signature certificate list, and another type of IPL information block that identifies an IPL device component list. Each IPL information block includes a common header followed by one or more specific types of IPL information block entries.

Figure 6:
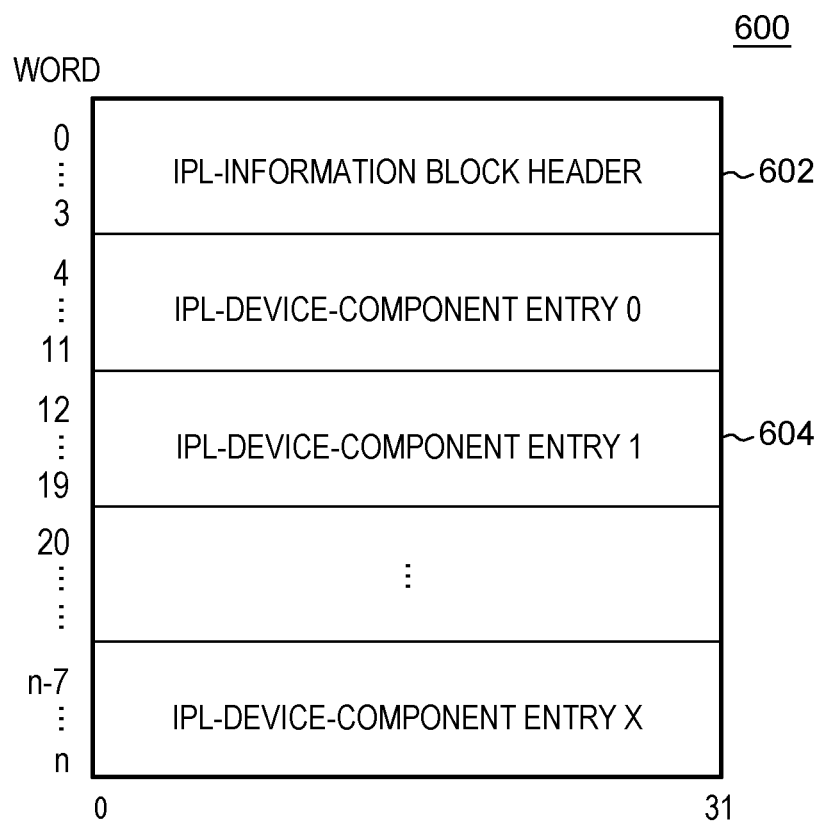
FIG. 6 depicts one example of an IPL information block for an IPL device component list used in accordance with an aspect of the present invention.
Figure 7:
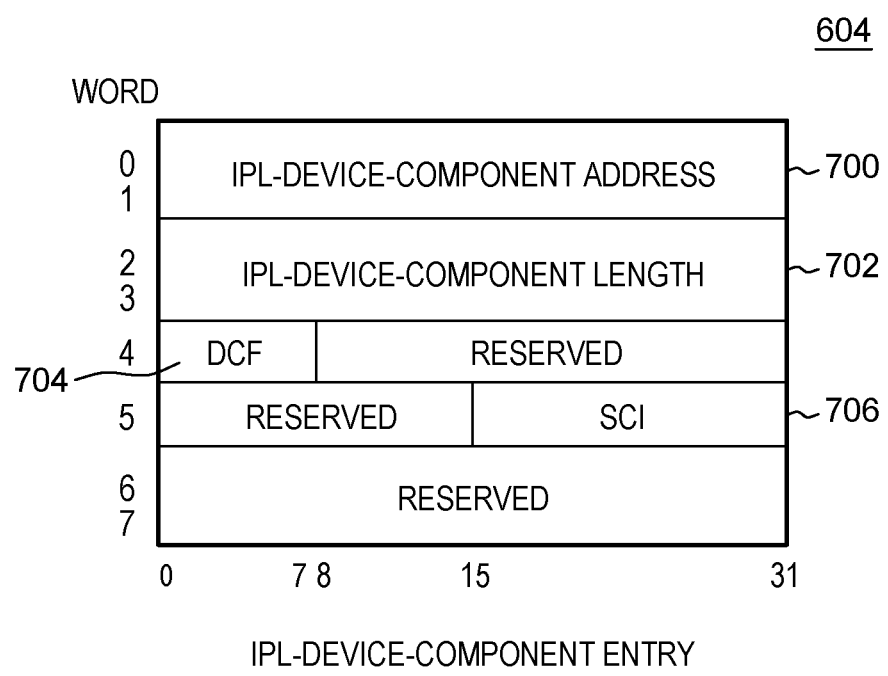
FIG. 7 depicts one example of an IPL device component entry of the IPL information block of FIG. 6, in accordance with an aspect of the present invention.

Further details regarding IPL information blocks are described with reference to FIGS. 4-7. For instance, FIGS. 4-5 depict one example of information relating to an IPL information block for an IPL signature certificate list, and FIGS. 6-7 depict one example of information relating to an IPL information block for an IPL device component list, each of which is described below.

Figure 4:
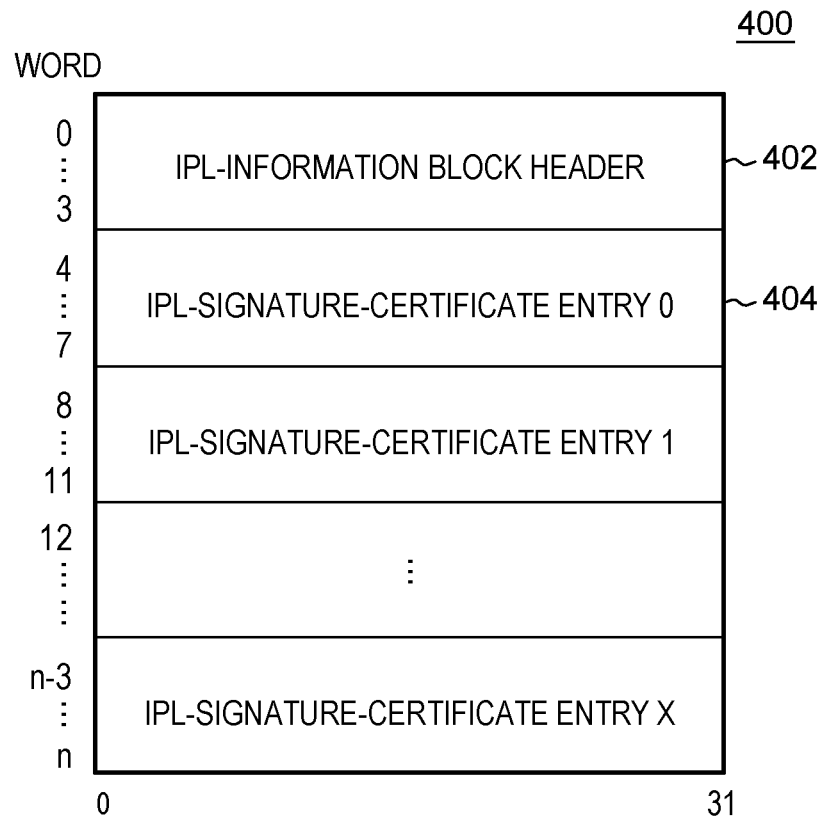
FIG. 4 depicts one example of an IPL information block for an IPL signature certificate list used in accordance with an aspect of the present invention.

Referring to FIG. 4, one example of an IPL information block for an IPL signature certificate list (ISC) is described. In one example, an IPL-Information Block for IPL-Signature Certificate List 400 includes a list of, e.g., X.509 certificates from one or more kernel distributors (e.g., Linux distributors). X.509 is a standard defining the format of the public key certificates. One or more X.509 certificates may be used to verify the signed components.

In one example, IPL Information Block for an IPL-Signature-Certificate list 400 includes a header, such as an IPL-Information Block Header 402 and one or more entries, such as IPL-Signature-Certificate Entry 0-X 404. IPL-Information Block Header 402 includes, for instance, a length field indicating a length of the IPL information block and a type field indicating a type of the IPL information block (e.g., a value of 1 specifies an IPL signature certificate list, and a value of 2 specifies an IPL device component list). Further details of an IPL signature certificate entry are described with reference to FIG. 5.

Figure 5:
FIG. 5 depicts one example of an IPL signature certificate entry of the IPL information block of FIG. 4, in accordance with an aspect of the present invention.

Referring to FIG. 5, in one example, IPL-Signature-Certificate Entry 404 includes an IPL signature certificate address field 500 that includes an IPL-Signature-Certificate Address, which is, for instance, a 64-bit unsigned binary integer specifying, e.g., the absolute storage location of an X.509 certificate; and an IPL signature certificate length field 502 that includes an IPL-Information-Certificate length, which is, for instance, a 64-bit unsigned binary integer specifying the number of bytes in an X.509 certificate.

As indicated above, in addition to the IPL information block for an IPL signature certificate list, in one embodiment, there is an IPL information block for an IPL device component list (IDC). The IPL device component list may contain three types of IPL device component entries including, for instance: two types that include binary code components (BCCs): unsigned binary code components and signed binary code components; and a third type that includes signed signature components (SCCs). There can be one or more signed and/or unsigned binary code components. Each signed binary code component has a corresponding signed signature component which was generated by the kernel distributor, e.g., Linux distributor, when it signed the signed binary code component. The signed signature component and signed binary code component form a pair, and in one example, the signed signature component entry immediately precedes the signed binary code component entry. This format enables the boot loader to locate the signed signature component first and then the signed binary code component can be easily found in the next component entry (backward/reverse chaining is not required) which can be used to verify the signature located in the current entry.

One example of an IPL information block for an IPL device component is described with reference to FIG. 6. Referring to FIG. 6, in one example, an IPL information block for an IPL-Device-Component List 600 includes a header, such as an IPL-Information Block Header 602 and one or more entries, such as IPL-Device-Component Entry 0-X 604. IPL-Information Block Header 602 includes, for instance, a length field indicating a length of the IPL information block and a type field indicating a type of the IPL information block (e.g., a value of 1 specifies an IPL signature certificate list, and a value of 2 specifies an IPL device component list). Further details of an IPL device component entry are described with reference to FIG. 7.

Referring to FIG. 7, in one example, IPL-Device-Component Entry 604 includes, for instance:

IPL device component address field 700 that includes an IPL-Device-Component Address, which is, e.g., a 64-bit unsigned binary integer specifying, for instance, the absolute storage location of the binary code of a component;

IPL device component length field 702 that includes an IPL-Device-Component length, which is, e.g., a 64-bit unsigned binary integer specifying the number of bytes in the binary code of a component;

IPL device component flags (DCF) field 704 that includes a plurality of flags, such as, for instance:

Signed component (SC) flag (e.g., bit 0): When one, the binary code of the component is signed, and when zero, the binary code of the component is not signed; and Component signature verified (CSV) flag (e.g., bit 1): When one indicates the component signature verification is successful, and when zero, the component signature verification is unsuccessful. CSV is meaningful, in one example, only when SC flag is set to one. When SC is set to zero, the CSV flag is also set to zero.

IPL signature certificate index (SCI) field 706 that includes, e.g., a 16-bit unsigned binary integer specifying the index of the IPL signature certificate entry containing the X.509 certificate that was used to verify this signed component. In one example, the SCI field is meaningful only when the SC bit is set to one, indicating that the binary code of the component is signed. When a signed binary code component is verified successfully, the index of the IPL signature certificate (ISC) entry whose certificate was used to successfully verify the signed binary code component is saved in the SCI field of the signed binary code component entry.

In one embodiment, to perform secure IPL processing using the IPL information block(s), the boot loader verifies that there is at least one signed signature component and signed binary code component pair when a secure IPL (SIPL) flag (e.g., stored in a select location, such as memory, a register, etc.) is set to, e.g., one (e.g., by selecting a secure IPL option via the SE's IPL panel). One or more unsigned binary code components may also be present and may be intermixed with one or more signed signature component and signed binary code component pairs.

When the boot loader finds a signed signature component and signed binary code component pair, it traverses through the IPL signature certificate (ISC) list and extracts the public key from the X.509 certificate obtained from one of the kernel distributors (e.g., Linux distributors), one at a time, and uses it to try to verify the signed binary code component until either the signature verification is successful, or all the public keys obtained from the distributors have been tested but none of them are able to verify the signature.

If the entry following the signed signature entry does not contain the signed binary code or the binary code is not the binary code that was used to generate the signature, the CSV flag is set to, e.g., zero.

To further explain, in one example, the IPL load device (e.g., IPL load device 131 and/or IPL load device 168) is a fixed-block direct-access load device used during list-directed IPL. A fixed-block direct-access load device is a device that includes, e.g., equal-sized data blocks, referred to as logical blocks. Each logical block on the device is consecutively numbered starting with, e.g., zero. The address of a logical block is referred to as its logical block address (LBA).

In one embodiment, up to 31 programs can be stored on a load device. The means of selecting the program to be loaded during list-directed IPL, and the location of program code on the load device is defined below.

Data is organized on the load device into a boot record and a hierarchy of single-block tables. The boot record identifies the device as an IPL device and points to a program table.

A program table is a set of up to, e.g., 31 pointers, corresponding to up to, e.g., 31 programs. Each pointer contains the logical block address of a component table, which designates program components of a program to be loaded during list-directed IPL. In any single list-directed IPL operation, in one example, only one program is loaded, and only one component table is used. The program to be loaded during a list-directed IPL operation is one of the input parameters of list-directed IPL.

A component table includes a set of entries, each of which indicates the logical block address of a component, which is a linked list of pointers indicating the locations of a program on the load device. Each entry in the component table also contains a component type and a location in logical partition or virtual machine storage into which the component is to be stored. Example component types include the following (other examples are also possible):

x'01' Code x'01' is used to identify the component table entry as the final entry in the component table. The contents of the component table which follow this entry are ignored. When the SIPL flag is one, the load address/load PSW/signature information field (e.g., bytes 24-31 of the component entry) contains a valid PSW and it points to the beginning of a signed binary code component.

x'02' Code x'02' designates the component as binary code to be loaded. When the type-x'02' component entry is immediately preceded by a type-x'03' component entry, the binary code is a signed binary code; otherwise, the binary code is not a signed binary code.

In one example, when SIPL is set to one, the type-x'02' component entry is immediately preceded by a type-x'03' component entry, and the binary code is not a multiple of the disk's block size, the unused portion of the disk's block is padded with zeros, and the padded bytes are used when generating the signature of the binary code.

x'03' Code x'03' is used to identify the component table entry as a signature information entry and contains the signature of the signed binary code of the next component table entry. Therefore, the next component table entry is to be a type-x'02' component table entry with the signed binary code whose signature is to be verified using the public key from one of the certificates obtained from the distributors.

The list of pointers in a component are referred to as segment tables. Segment tables contain pointers which point to segments of data to be loaded during list-directed IPL.

Thus, in one example, if the segment table of the next component table entry does not contain the signed binary code or the binary code is not the binary code that was used to generate the signature in the segment table of the current component table entry, the component signature verified (CSV) flag in the IPL device component entry is set to, e.g., zero to indicate that the component signature verification by the boot loader is not successful. Otherwise, the component signature verified flag is set to one to indicate that the component signature verification by the boot loader is successful. The CSV flag is useful in determining which binary code components contain signature verification error.

When the secure IPL flag is set to, e.g., one, the boot loader continues with the IPL process only if the signature verification is successful. Otherwise, if the flag is set to, e.g., zero, the boot loader continues with the IPL process even if the signature verification is not successful. The latter is useful during testing of the secure IPL process.

Further, as indicated above, in one embodiment, there is a component entry in the component table called a final component entry (FCE). When the SIPL flag is, e.g., one, the final component entry contains a valid PSW and it points to the beginning of the first signed binary code component (BCC). Each signed and unsigned binary code component has guard code at the top of the binary code component and it is designed to detect if the IPL load device (ILD) image is properly setup in the IPL load device and if the PSW in the FCE points to the beginning of the first signed binary code component (e.g., a stage-3 boot loader). Such design would also be able to detect if any of the component entries are tampered with by an application program, either intentionally or unintentionally.

The guard code of the first binary code component that gets executed either continues with the IPL process or terminates the IPL process based on one or more security checks.

One option is to initialize an indicator, such as a valid start PSW (program status word) flag to, e.g., zero. When the guard code of the first signed binary code component is invoked, it checks the PSW pointer of the FCE to determine if the PSW points to the beginning of its own signed code. If it does, the valid start PSW flag is set to, e.g., one. Otherwise, it falls into the (disable wait PSW) trap code which terminates the IPL process. Other (signed and unsigned) components (e.g., all components) check the valid start PSW flag. If the valid Start PSW flag is set to, e.g., one, it bypasses the (disable wait PSW) trap code and continues with the IPL process. Otherwise, it falls into the (disable wait PSW) trap code which terminates the IPL process.

Another option for the guard code is to inspect the contents of the IPL information report block to determine if they were properly setup. If they are properly setup, it continues with the IPL process. Otherwise, it falls into the (disable wait PSW) trap code which terminates the IPL process. Some items that can be validated are, for instance: there is at least one signed binary code component; each signed binary code component has a corresponding signed signature component; each signed signature component entry immediately precedes the signed binary code component entry; and each signed signature component which was generated by the kernel distributor when it signed the signed binary code component is a valid signed signature component. Additional, less and/or different items may be validated.

Further details of a secure IPL process are described with reference to FIGS. 8-9. For instance, FIG. 8 depicts one example of a secure initial program load and boot process, and FIG. 9 depicts guard code processing, each of which is described further below.

Figure 8:
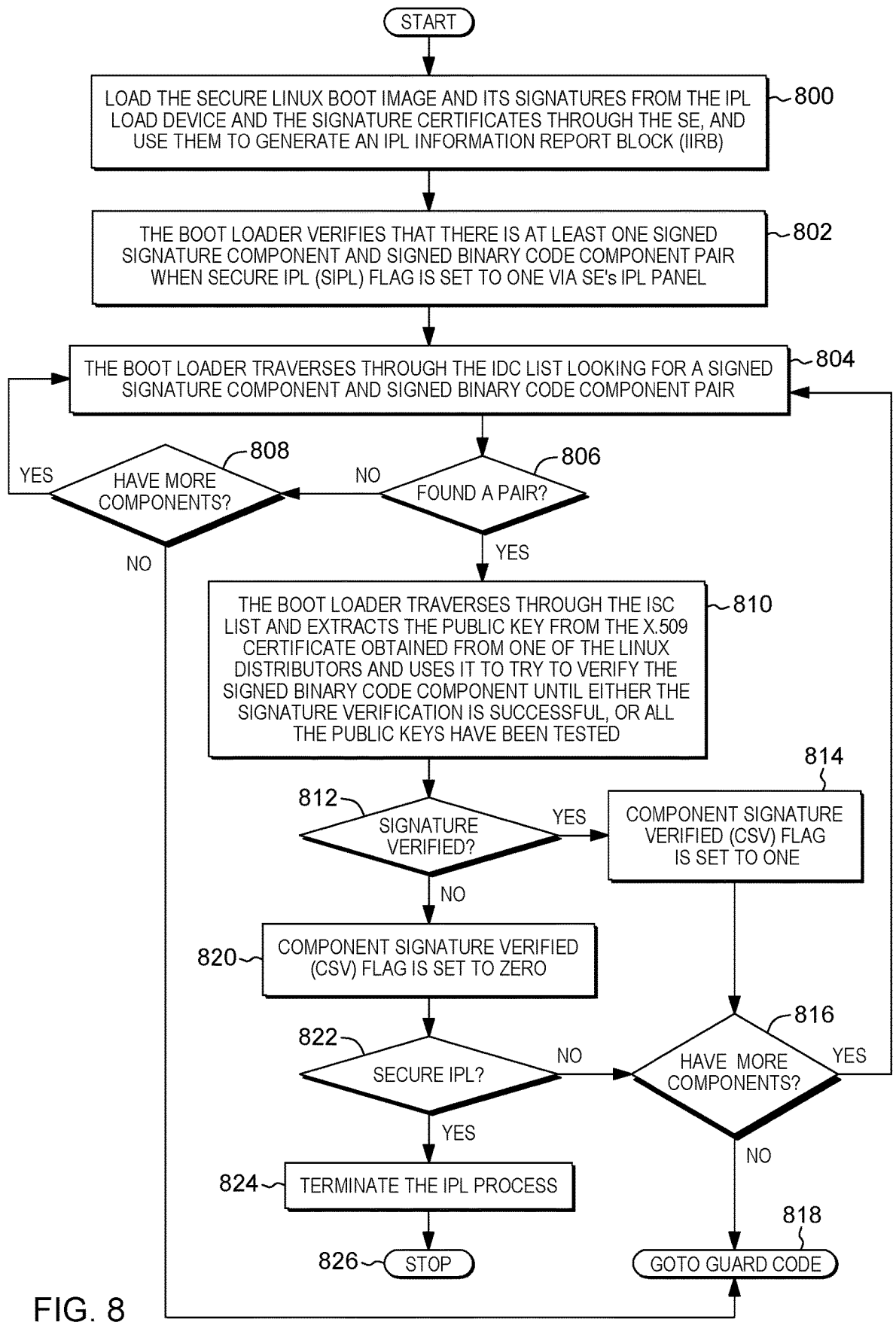
FIG. 8 depicts one example of a process for performing a secure IPL of a list directed IPL device, in accordance with an aspect of the present invention.

Referring initially to FIG. 8, a secure boot image (e.g., Linux boot image that includes one or more signed and/or unsigned binary code components), loaded, e.g., from an initial program load device, and its signatures, loaded, e.g., from the signature certificates through the service element (SE), are used to generate an IPL information report block (e.g., IPL-Information-Report Block (IIRB) 300), STEP 800. The boot loader verifies that there is at least one signed signature component and signed binary code component pair when a secure IPL (SIPL) flag is set to, e.g., one via an SE's IPL panel, STEP 802.

The boot loader traverses through the IDC list looking for a signed signature component and signed binary code component pair, STEP 804. A determination is made as to whether a pair was found, INQUIRY 806. If a pair was not found, then a further determination is made as to whether there are more components, INQUIRY 808. If there are more components, then processing continues to STEP 804. However, if there are no more components, then processing continues with a guard code security checking process, described below, STEP 818.

Returning to INQUIRY 806, if a pair is found, the boot loader traverses through the ISC list and extracts the public key from the X.509 certificate obtained from one of the kernel (e.g., Linux) distributors and uses it to try to verify the signed binary code component until either the signature verification is successful or all the public keys have been tested, STEP 810. A determination is made as to whether the signature was verified, INQUIRY 812. If the signature was verified, then a component signature verified (CSV) flag is set to, e.g., one, STEP 814. Thereafter, a determination is made as to whether there are more components, INQUIRY 816. If there are more components, then processing continues to STEP 804. Otherwise, processing continues to STEP 818, described below.

Returning to INQUIRY 812, If the signature was not verified, then the component signature verified (CSV) flag is set to, e.g., zero, STEP 820. Further, a determination is made as to whether this is to be a secure IPL, INQUIRY 822. If this is to be a secure IPL, then the IPL process is terminated, STEP 824, and processing ends, STEP 826.

Returning to INQUIRY 822, if this is not to be a secure IPL, a determination is made as to whether there are more components, INQUIRY 816. If there are more components, processing continues to STEP 804. Otherwise, processing continues to the guard code security checking process, STEP 818.

One example of the guard code security checking process is described with reference to FIG. 9. In one example, the boot loader initializes an indicator, such as a Valid_Start_PSW flag, to zero, STEP 900. A program status word (PSW) is, in one example, a register or other location that stores status and acts as a program counter. Further, the boot loader transfers control to the binary code pointed to by a loaded PSW, STEP 902. Additionally, the boot loader traverses through the binary code components starting at the load PSW pointer, STEP 904.

A determination is made as to whether this is to be a secure IPL, INQUIRY 906. If this is a secure IPL, then a determination is made as to whether this is the first signed component, INQUIRY 908. If this is the first signed component, then a further determination is made as to whether the loaded PSW points to itself (the first signed component), INQUIRY 910. Should the loaded PSW not point to itself (the first signed component), then processing falls into the trap code (e.g., disable wait PSW) and terminates the IPL process, STEP 912. Processing then terminates, STEP 914.

Returning to INQUIRY 910, if the loaded PSW points to itself (the first signed component), then the Valid_Start_PSW flag is set to, e.g., one and the IPL process continues, STEP 916. A determination is made as to whether there are more components, INQUIRY 918. If there are more components, then processing continues to STEP 904. Otherwise, if there are no more components, the IPL is successful, STEP 920, and processing terminates, STEP 914.

Returning to INQUIRY 908, if this is not the first signed component, then a further determination is made as to whether the Valid_Start_PSW flag is set to, e.g., one, INQUIRY 922. If it is not set to one, then processing falls into the (disable wait PSW) trap code and the IPL process is terminated, STEP 924. Otherwise, if the Valid_Start_PSW flag is set to, e.g., one, the trap code is bypassed, and the IPL process continues, STEP 926. Processing continues with INQUIRY 918.

Returning to INQUIRY 906, if this is not a secure IPL, the Valid_Start_PSW flag is set to, e.g., one and the IPL process continues, STEP 926. Processing continues to INQUIRY 918.

As described herein, in one or more aspects, the signed and unsigned code components can appear in any order to provide code components packaging flexibility. The code components do not have to be packaged in a particular order. The code components can be stored in any order (on the disk and in main memory) and may be executed in any order. Also, new order-less components can be easily added and maintained in the future. Thus, the order-less implementation avoids being tied to a specific packaging format and packaging complexity.

The boot loader verifies all the code and data blocks loaded from the IPL load device which provides better security. The boot loader verifies the signatures; verifies that there is no component overlap; and verifies that the initial load PSW loaded from the IPL load device is valid, as examples.

The PSW points to the signed code component containing the guard code to perform secure IPL which provides better security. The guard code of the first component that gets executed either continues with the IPL process or terminates the IPL process based on one or more security checks. One option is to initialize the Valid_Start_PSW flag to zero. When the guard code of the first signed component is invoked, it checks the type-01 entry (containing PSW pointer) to see if the PSW points to the beginning of its own signed code. If it does, the Valid_Start_PSW flag is set to one. Otherwise, it falls into the (disable wait PSW) trap code which terminates the IPL process. All other (signed and unsigned) components check the Valid_Start_PSW flag. If the Valid_Start_PSW flag is set to one, it bypasses the (disable wait PSW) trap code and continues with the IPL process. Otherwise, it falls into the (disable wait PSW) trap code which terminates the IPL process. Another option is to inspect the IPL information report block to find out what should happen.

The code component and corresponding signature component are separate to allow related new types of components to be added in the future. For instance, more types of components may be added. Specific code formats including signatures are not relied on. Usage of more than one certificate per IPL is allowed, which may be used in the future. As examples, the boot volumes may contain different components (e.g., stage-3 boot loader, different kernels, different parameter lists, different RAM (random access memory) disks) and a selection of those components can be booted—the selection is done via a boot menu; different components could be prepared at different times and signed with different keys (e.g., there might be an old (signed stable) rescue kernel and a more modern standard kernel and new level-3 boot loader so the different components could be signed by different keys); zIPL allows the combination of the components for a boot process without requiring to re-sign older components as long as their signing keys are still valid. This also allows the combination of different components from different owners/vendors (e.g., a kernel from one vendor and a software boot loader from another vendor).

As described herein, the signature verification setup may, for instance: have more than one certificate from different vendors in a separate list; the signature and component are separate entries (e.g., type3+type2); the signature is paired up with a component (type3+type 2); have guard code in the binary code component for added protection against attacks; there may be multiple signed and unsigned binary code sections without any kind of structure; the boot loader may need/use more than one certificate (one per signed code section); and/or the boot loader tests the certificates (one at a time) to find the one that matches the signature of the signed code section and stores the index of the matched certificate in the signed component list.

One or more aspects of the present invention are inextricably tied to computer technology and facilitate processing within a computer, improving performance thereof. In one or more aspects, security is enhanced and processing is facilitated by providing a secure IPL load process. Further details of one embodiment of facilitating processing within a computing environment, as it relates to one or more aspects of the present invention, are described with reference to FIGS. 10A-10B.

Referring to FIG. 10A, in one embodiment, an initial program load of a system component (e.g., a kernel) of the computing environment is performed (1000). The performing the initial program load includes determining whether one or more signatures of one or more signed binary code components relating to the system component are verified (1002). Based on determining that the one or more signatures are verified, additional verification is performed (1004). The performing additional verification includes, for instance, obtaining a select binary code component of one or more binary code components relating to the system component (1006) and determining whether the select binary code component is a particular signed binary code component with respect to the one or more binary code components (e.g., a first signed binary code component) 1008. Based on determining that the select binary code component is the particular signed binary code component, a check is performed (1010). Based on a successful check, the performing of the initial program load continues (1012).

A secure initial program load of a system component, such as a kernel, is provided, enhancing security within a computing environment and facilitating processing within the environment.

In one embodiment, the one or more binary code components include the one or more signed binary code components and one or more unsigned binary code components, and the one or more binary code components are unordered (1014). By not requiring an order, packaging is flexible and less complex. This enables additional device components to be added, etc.

As one example, the one or more signatures are stored separately from the one or more signed binary code components (1016). This enhances security.

In one example, the obtaining the select binary code component includes choosing the select binary code component based on a pointer in a control location (e.g., a program status word) (1018).

As one example, referring to FIG. 10B, the performing the check includes determining whether the pointer points to itself (e.g., the first signed component), in which the check is successful based on the pointer pointing to itself (1020).

Further, in one example, a valid indicator is set to a select value, based on the successful check (1022).

In one embodiment, the continuing with performing the initial program load includes obtaining another binary code component (1024); determining, based on obtaining the other binary code component, whether the valid indicator is set to the select value (1026); and repeating, based on determining that the valid indicator is set to the select value, the obtaining and the determining based on there being other binary code components to be processed (1028).

In one example, the continuing with performing the initial program load includes terminating the initial program load based on determining that the valid indicator is set to a value other than the select value (1030).

In one example, the performing additional verification further includes determining whether a secure initial program load is to be performed (1032); and performing, based on determining that the secure initial program load is to be performed, the determining whether the binary code component is the particular signed binary code component with respect to the one or more binary code components (1034).

Further, in one embodiment, using the one or more binary components and the one or more signatures an information report block is generated (1036). The information report block is employed in, at least, determining whether the one or more signatures are verified (1038).

Other variations and embodiments are possible.

Figure 11A:
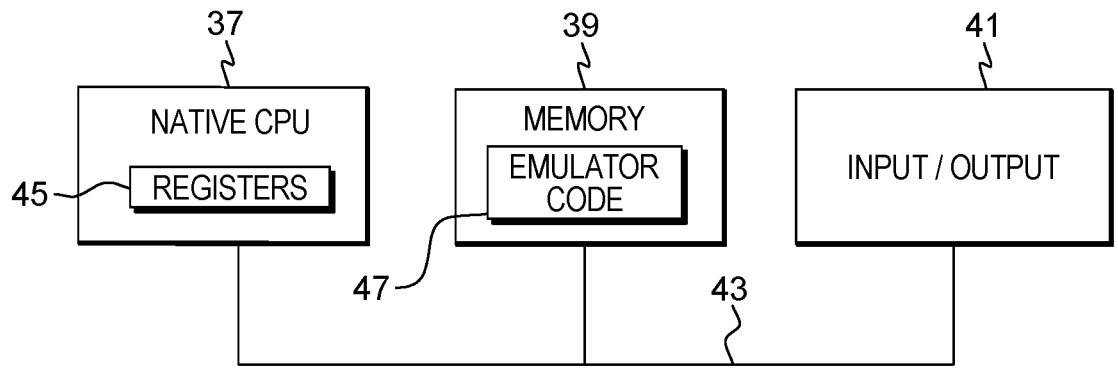
FIG. 11A depicts another example of a computing environment to incorporate and use one or more aspects of the present invention.

Other types of computing environments may also incorporate and use one or more aspects of the present invention, including, but not limited to, emulation environments, an example of which is described with reference to FIG. 11A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC processor offered by International Business Machines Corporation, Armonk, N.Y.; and/or other machines based on architectures offered by International Business Machines Corporation, Intel, or other companies.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture hardware architecture, such as PowerPC processors, or other servers or processors, to emulate the z/Architecture hardware architecture and to execute software and instructions developed based on the z/Architecture hardware architecture.

Figure 11B:
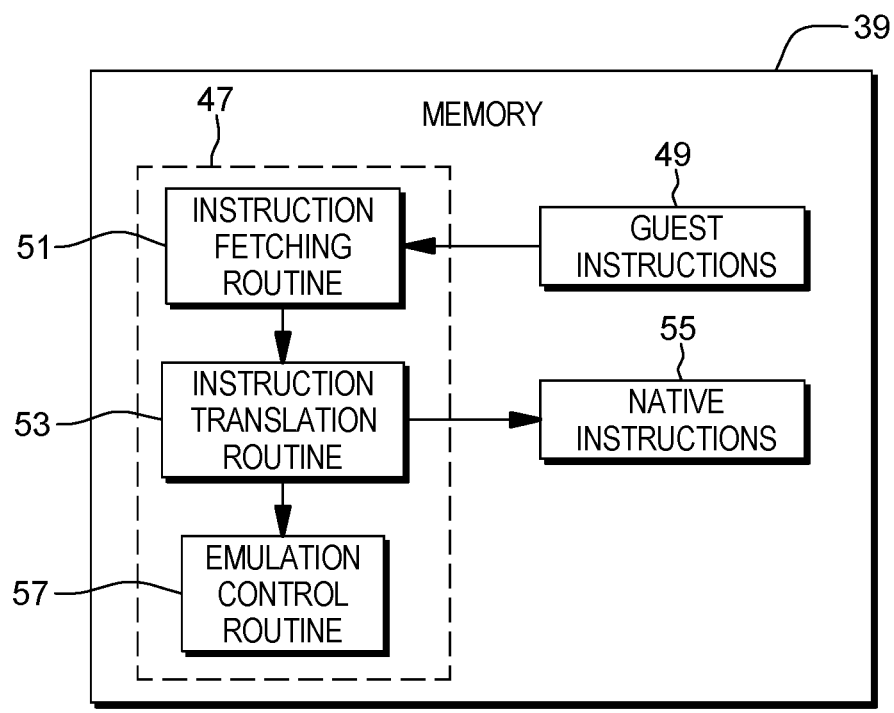
FIG. 11B depicts further details of the memory of FIG. 11A.

Further details relating to emulator code 47 are described with reference to FIG. 11B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture hardware architecture processor, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries. Linux is a registered trademark of Linus Torvalds in the United States, other countries or both.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
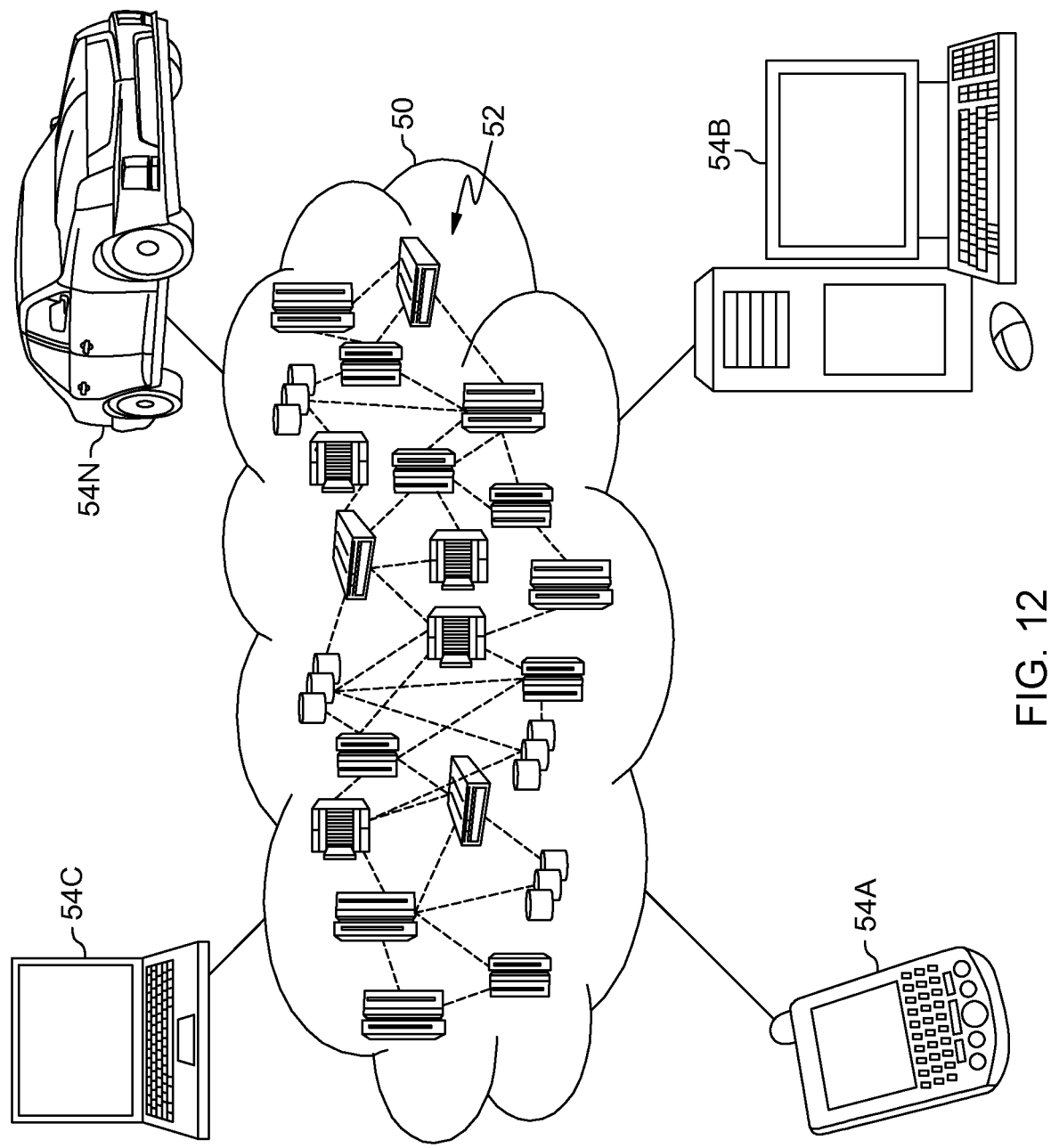
FIG. 12 depicts one embodiment of a cloud computing environment.

Referring now to FIG. 12, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 52 and cloud computing environment 50 can communicate with any type of computerized device over any type of network and/or network addressable connection (e.g., using a web browser).

Figure 13:
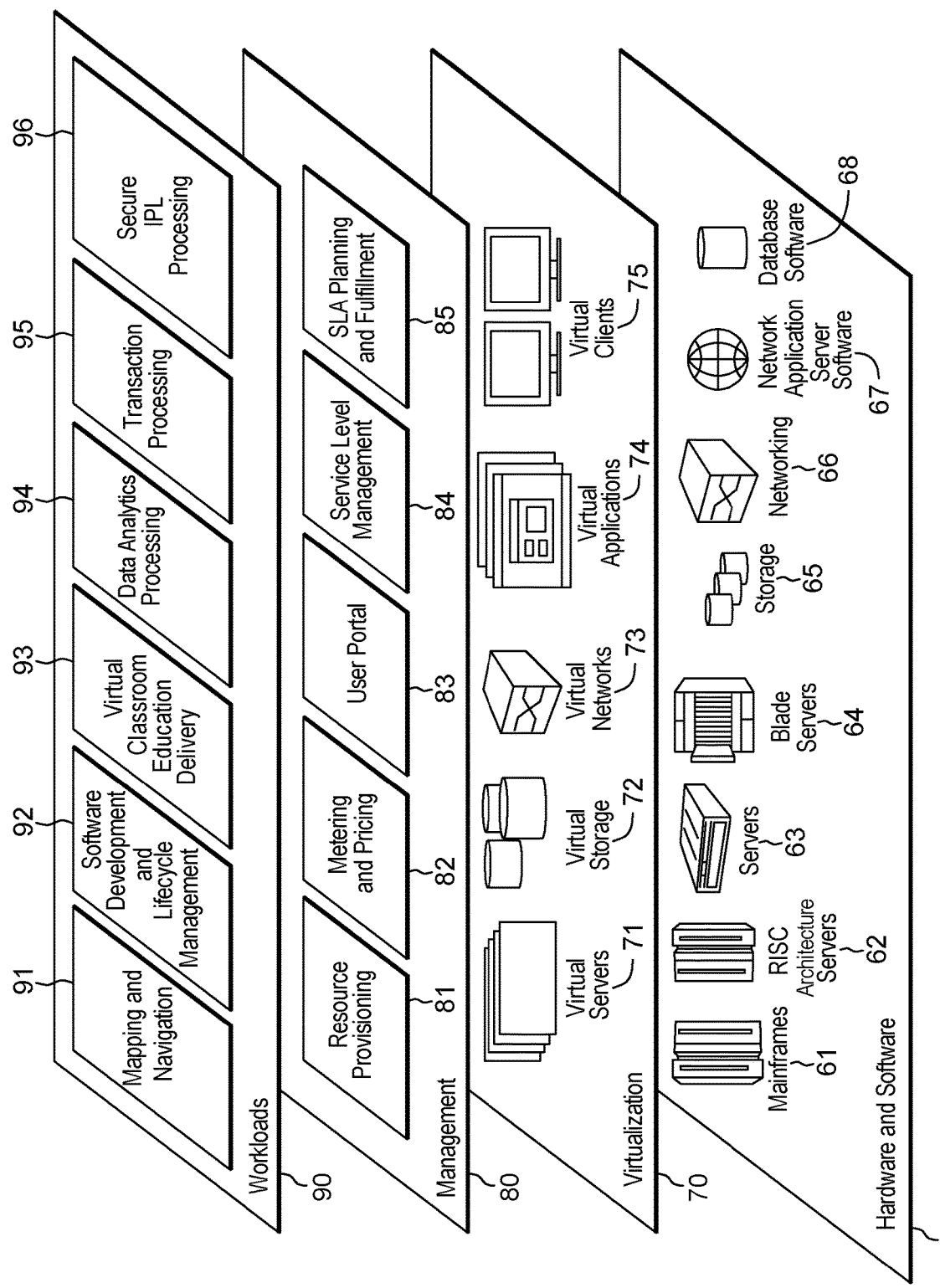
FIG. 13 depicts one example of abstraction model layers.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure IPL processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different boot processes may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
      performing an initial program load of an application of the computing environment, the performing the initial program load of the application comprising:
         performing verification for the initial program load of the application, based on determining that one or more signatures of one or more signed binary code components relating to the application are verified, the performing verification comprising:
            determining whether a selected binary component of one or more binary code components relating to the application is a particular signed binary code component with respect to, at least, the one or more signed binary code components, wherein the determining determines whether the selected binary code component is in a particular execution order with respect to, at least, the one or more signed binary code components;
         performing a check based on determining that the selected binary code component is the particular signed binary code component in the particular execution order, the performing the check to confirm that the selected binary code component is the particular signed binary code component; and
         continuing with performing the initial program load of the application based on a successful check confirming that the selected binary code component is the particular signed binary code component.

2. The computer program product of claim 1, wherein the one or more binary code components comprise the one or more signed binary code components and one or more unsigned binary code components, and wherein the one or more binary code components are unordered in a list of the one or more binary code components used to perform the initial program load of the application.

3. The computer program product of claim 1, wherein the one or more signatures are stored separately from the one or more signed binary code components.

4. The computer program product of claim 1, wherein the selected binary code component is transferred to using a pointer in a selected location.

5. The computer program product of claim 4, wherein the selected location is a program status word used store program status and to act as a program counter.

6. The computer program product of claim 4, wherein the selected location is used to store program status, and wherein the performing the check comprises determining whether the pointer in the selected location points to the selected binary code component, wherein the check is successful based on the pointer pointing to the selected binary code component.

7. The computer program product of claim 1, wherein a valid indicator is set to a select value, based on the successful check.

8. The computer program product of claim 7, wherein the continuing with performing the initial program load comprises:
   obtaining another binary code component;
   determining, based on obtaining the another binary code component, whether the valid indicator is set to the select value; and
   repeating, based on determining that the valid indicator is set to the select value, the obtaining the another binary code component and the determining whether the valid indicator is set, based on there being other binary code components to be processed.

9. The computer program product of claim 8, wherein the continuing with performing the initial program load comprises terminating the initial program load based on determining that the valid indicator is set to a value other than the select value.

10. The computer program product of claim 1, wherein the performing verification further comprises:
    determining whether a secure initial program load is to be performed; and
    performing, based on determining that the secure initial program load is to be performed, the determining whether the selected binary code component is the particular signed binary code component with respect to, at least, the one or more signed binary code components.

11. The computer program product of claim 1, wherein the particular signed binary code component is a signed binary code component of the one or more signed binary code components indicated to be a first signed binary code component.

12. The computer program product of claim 1, wherein the application is an operating system kernel, and wherein the performing the initial program load is performed, at least in part, using a boot loader.

13. The computer program product of claim 1, wherein the method further comprises:
    using the one or more binary code components and the one or more signatures to generate an information report block; and employing the information report block in, at least, determining whether the one or more signatures are verified.

14. The computer program product of claim 1, wherein the performing the initial program load of the application further comprises:
   determining whether the one or more binary code components include the one or more signed binary code components and whether the one or more signed binary code components have corresponding signed signature components; and
   based on the determining indicating that the one or more binary code components include the one or more signed binary code components and that the one or more signed binary code components have corresponding signed signature components, determining whether the one or more signatures of the one or more signed binary code components relating to the application are verified.

15. The computer program product of claim 14, wherein the determining whether the one or more signatures of the one or more signed binary code components is verified comprises for a signature of the one or more signatures of the one or more signed binary code components:
   traversing, by a boot loader used in performing at least a portion of the initial program load, a signature certificate list for a certificate obtained from a distributor of the application;
   extracting a key from the certificate; and
   using the key to verify the signature.

16. The computer program product of claim 1, wherein the one or more binary code components are indicated using one or more entries of a component data structure.

17. The computer program product of claim 16, wherein the selected binary code component is indicated using a selected entry of the component data structure, and wherein contents of the component data structure subsequent to the selected entry are ignored for the initial program load.

18. The computer program product of claim 1, wherein the particular signed binary code component is a signed binary code component indicated as a first signed binary code component using a status indicator located within a selected entry of a component data structure that includes one or more entries specifying one or more binary code components of the application for which the initial program load is being performed.

19. A computer system for facilitating processing within a computing environment, the computer system comprising:
   a memory; and
   a processor in communication with the memory, wherein the computer system is configured to perform a method, said method comprising:
      performing an initial program load of an application of the computing environment, the performing the initial program load of the application comprising:
         performing verification for the initial program load of the application, based on determining that one or more signatures of one or more signed binary code components relating to the application are verified, the performing verification comprising:
            determining whether a selected binary code component of one or more binary code components relating to the application is a particular signed binary code component with respect to, at least, the one or more signed binary code components, wherein the determining determines whether the selected binary code component is in a particular execution order with respect to, at least, the one or more signed binary code components;
            performing a check based on determining that the selected binary code component is the particular signed binary code component in the particular execution order, the performing the check to confirm that the selected binary code component is the particularly signed binary code component; and
            continuing with performing the initial program load of the application based on a successful check confirming that the selected binary code component is the particular signed binary code component.

20. The computer system of claim 19, wherein the selected binary code component is transferred to using a pointer in a selected location.

21. The computer system of claim 20, wherein the selected location is used to store program status, and wherein the performing the check comprises determining whether the pointer in the selected location points to the selected binary code component, wherein the check is successful based on the pointer pointing to the selected binary code component.

22. The computer system of claim 19, wherein the particular signed binary code component is a signed binary code component of the one or more signed binary code components indicated to be a first signed binary code component.

23. A computer-implemented method of facilitating processing within a computing environment, the computer-implemented method comprising:
   performing an initial program load of an application of the computing environment, the performing the initial program load of the application comprising:
      performing verification for the initial program load of the application, based on determining that, one or more signatures of one or more signed binary code components relating to the application are verified, the performing verification comprising:
         determining whether a selected binary code component of one or more binary code components relating to the application is a particular signed binary code component with respect to, at least, the one or more signed, binary code components, wherein the determining determines whether the selected binary code component is in a particular execution order with respect to, at least, the one or more signed binary code components;
         performing a check based on determining that the selected binary code component is the particular signed binary code component in the particular execution order, the performing the check to confirm that the selected binary code component is the particular signed binary code component; and
         continuing with performing the initial program load of the application based on a successful check confirming that the selected binary code component is the particular signed binary code component.

24. The computer-implemented method of claim 23, wherein the selected binary code component is transferred to using a pointer in a selected location used to store program status, and wherein the performing the check comprises determining whether the pointer in the selected location points to the selected binary code component, wherein the check is successful based on the pointer pointing to the selected binary code component.

* * * * *